Patented Feb. 18, 1941

2,232,034

UNITED STATES PATENT OFFICE 2,232,034

ISATIN DERIVATIVE AND A PROCESS FOR ITS MANUFACTURE

Henry Martin, Otto Neracher, and Walter Stammbach, Basel, Switzerland, assignors to the firm of J. R. Geigy A. G., Basel, Switzerland No Drawing. Application January 13, 1939, Serial No. 250,844. In Switzerland January 14, 1938

4 Claims. (Cl. 260—325)

In the U. S. Patents 2,070,350, 2,070,351, 2,070,352 and 2,070,353 there are described processes for making condensation products from isatin derivatives and phenols, which consist in condensing 1 molecule of an isatin derivative with about 2 molecules of alkylated or halogenated or alkylated and halogenated phenols. As isatin-derivatives there were used isatin-5-sulphonic acid, α-hydroxyethylisatin-5-sulphonic, N-(sulphobenzyl)-isatin, N-(sulpho-ortho-chlorobenzyl)-isatin, 6-chlorisatin-5-sulphonic acid and others.

The present invention is based on the observation that N-benzyl isatin sulphonic acids containing a sulphonic acid group in one of the positions 5 and 6 of the benzene radical of the indol nucleus of the formula

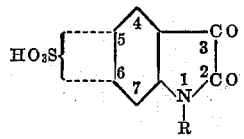

R meaning a benzyl or a halogenated benzyl radical, are particularly suitable for condensation with phenols or phenol derivatives.

Such condensation products with a benzyl-radical free from sulphonic acid groups are characterized by the fact that when they are applied in the usual manner to textile fibres they have above all an especially good fastness to washing and fulling, so that they are extremely suitable for yielding a protection against moths which is stable to washing and fulling.

The following examples illustrate the invention:

Example 1

31.7 parts by weight of N-benzylisatin-5-sulphonic acid, 30 parts of para-chlorophenol and 450 parts of sulphuric acid of 93% strength are stirred together at 25–30° C. for 12 hours. The mass is poured upon 450 parts of ice and the condensation product which has separated in the form of a tough mass is removed. After the sulphuric acid has been partially neutralized by sodium carbonate, any remaining chlorophenol is blown away by steam, the cooled solution is neutralized and the condensation product salted out with common salt. There remains on drying a bright powder soluble to a clear solution in hot water. The compound possesses the following formula:

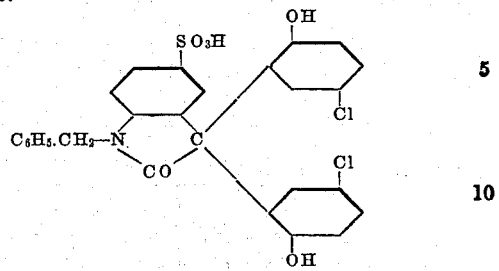

N-benzylisatin-5-sulphonic acid is obtained by the usual method by condensing isatin-5-sulphonic acid with benzyl chloride, for example in aqueous solution in the presence of an agent that binds hydrogen chloride.

Example 2

32.5 parts of N-(2'-chlorobenzyl)isatin-5-sulphonic acid, 30 parts of ortho-chlorophenol and 450 parts of sulphuric acid of 93% strength are stirred together at 25–30° C. for 12 hours. The mass is then poured upon about 450 parts of ice and the condensation product which has separated in the form of a viscous mass is removed. After the greater part of the sulphuric acid is neutralized with sodium cabonate, the excess of ortho-chlorophenol is blown away by steam. Then the whole is completely neutralized with sodium carbonate, the solution is cooled and the condensation product is salted out with common salt. After drying there is obtained a bright powder soluble to a clear solution in hot water. The compound has the following formula:

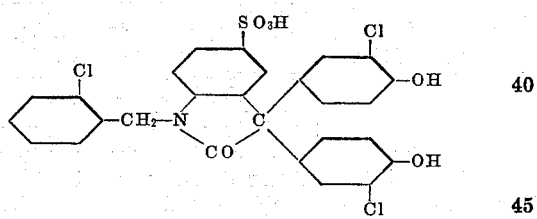

Example 3

35.2 parts of N-(4'-chlorobenzyl)isatin-5-sulphonic acid, 30 parts of para-chlorophenol and 450 parts of sulphuric acid of 93% strength are stirred together at 25–30° C. for 12 hours. The mass is then poured upon 450 parts of ice and the condensation product which has separated in the form of a paste is removed. After the greater part of the sulphuric acid is neutralized with sodium carbonate, the excess of para-chlorophenol is blown away by steam. Then the whole is completely neutralized with sodium carbonate, the solution is cooled and the condensation product is salted out with common salt. It is soluble to a clear solution in hot water, and corresponds to the following formula:

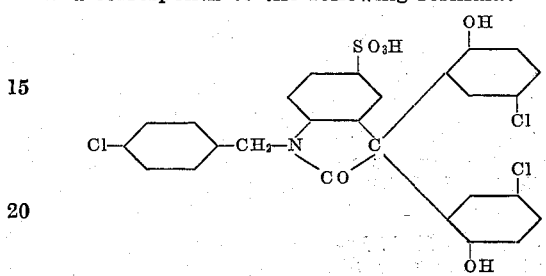

*Example 4*

38.6 parts of N-(4-chlorobenzyl)-4-chlorisatin-6-sulphonic-acid, 30 parts of para-chlorophenol and 450 parts of sulphuric acid of 93% strength are stirred together at 20–25° C. for 14 hours. The reaction mass is then poured upon 450 parts of ice and the condensation product which has separated in the form of a pulp like mass is removed. After the greater part of the sulphuric acid is neutralized with sodium carbonate, the excess of para-chlorophenol is blown away by steam. The remaining clear solution is completely neutralized, cooled down slightly and the condensation product salted out with common salt. After drying there is obtained a bright powder soluble to a clear solution in hot water, corresponding to the formula

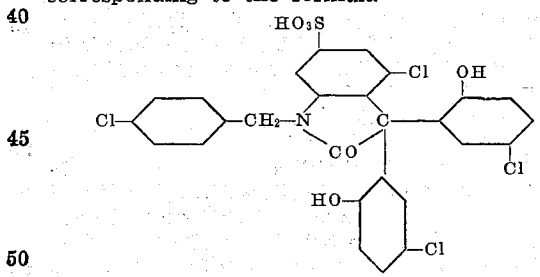

The N-(4'-chlorobenzyl)-4-chlorisatin-6-sulphonic acid is obtained by condensing 4-chlorisatin-6-sulphonic acid with para-chlorobenzyl-chloride in aqueous alkaline medium.

*Example 5*

35.2 parts of N-(4'-chlorobenzyl)isatin-5-sulphonic acid, 36 parts of meta-chloranisole and 450 parts of sulphuric acid of 85% strength are stirred together at 25–30° C. for 12 hours. The reaction mass is then poured upon 450 parts of ice and the condensation product which has separated in the form of a paste is dissolved in water. After the greater part of the sulphuric acid is neutralized with sodium carbonate, the excess of meta-chloranisole is blown away by steam. Then the clear solution is completely neutralized and the condensation product is salted out hot. After drying there is obtained a bright powder soluble to a clear solution in hot water.

Instead of the above mentioned phenols others may be used with the same result, for instance: ortho- and para-bromophenol, para-chloro- or bromo-meta-cresol, para-chloranisole, dichlorphenols, such as 3:4-dichlorophenol, 3:4-dichlorophenetole, thymol, amyl-ortho-cresol, para-tert.-amylphenol, 2-chloro-para-tert.-amyl-phenol and the like. It has the formula

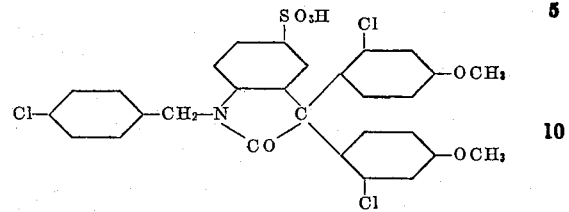

What we claim is:

1. As compounds useful for protection against moths, products of the following general formula:

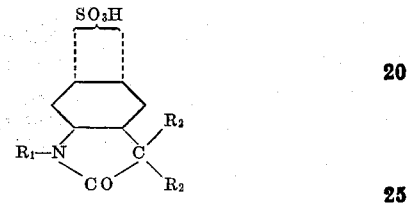

wherein $R_1$ means one of the group consisting of benzyl and chlorinated benzyl radicals and $R_2$ mean two phenol radicals of the benzene series selected from the group consisting of halogenated phenols, alkyl phenols and alkyl ethers thereof.

2. As a compound useful for protection against moths, the product of the following formula:

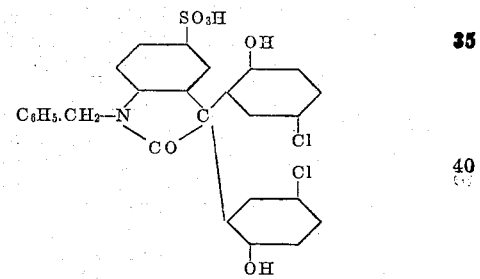

3. As a compound useful for protection against moths, the product of the following formula:

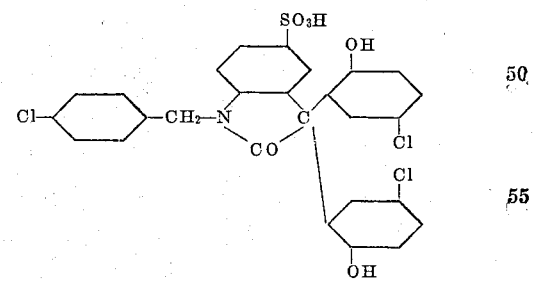

4. As a compound useful for protection against moths, the product of the following formula:

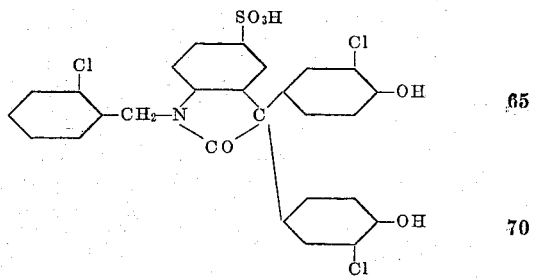

HENRY MARTIN.
OTTO NERACHER.
WALTER STAMMBACH.